Patented July 6, 1943

2,323,363

UNITED STATES PATENT OFFICE 2,323,363

MOLDING COMPOSITION

George W. Whitehead, Springfield, Mass., assignor to Monsanto Chemical Company, St. Louis, Mo., a corporation of Delaware No Drawing. Application November 24, 1939,
Serial No. 305,894

11 Claims. (Cl. 260—36)

The present invention relates to polyvinyl acetal resin molding compositions.

Polyvinyl acetal resins have heretofore found but little use in molding compositions due to several reasons, one of which is the notorious sticking of the molding powder to the mold. Another objection heretofore to the use of polyvinyl acetal resins in molding compositions has been the forming of laminations or layers thereof during injection molding processes.

An object of this invention is to provide a new molding composition.

Another object of this invention is to provide a new molding composition comprising a polyvinyl acetal, which not only takes the form of the mold readily on the application of heat, but which may be readily removed from the mold, and which does not result in the forming of layers or laminations in an injection molded product.

Other and further objects of the present invention are to provide molded products having high water resistance, toughness, low shrinkage and marked resistance to heat.

More particularly, the present invention relates to molding compositions comprising partial polyvinyl acetal resins to which has been added one or more mono-hydroxy carboxylic acids.

For purposes of illustration we may employ those materials described in U. S. patent to Morrison et al. Reissue No. 20,430 dated June 29, 1937, and in French Patent No. 793,175. These polyvinyl acetal resins vary in the proportion of the degree of hydrolysis of the ester and the degree of combination of the aldehyde. As an example of a polyvinyl acetal resin for use in the molding compositions of the present invention, polyvinyl acetate is hydrolyzed and reacted with formaldehyde so that the final resin may be considered to be made substantially of 5% to 8% of hydroxyl groups calculated as polyvinyl alcohol, 10% to 16% acetate by weight, and the balance acetal. The resin so obtained and known as "Formvar," when compounded according to the present invention, has been found to possess excellent molding properties, and exhibit substantially no tendency to stick to the mold after completion of the molding process.

Another very desirable resin for use as a molding composition, when compounded according to the present invention, and known as "Butvar" may be made by hydrolyzing a polyvinyl acetate and reacting with butyraldehyde so that the final resin may be considered to be made substantially of 2% or less of acetate, 16% to 20% hydroxyl groups, calculated as polyvinyl alcohol and the balance acetal. Polyvinyl acetals made with other aldehydes, as for example acetaldehyde, propionaldehyde, benzaldehyde, furfuraldehyde, valeraldehyde and the like or mixtures of aldehydes may be used according to the present invention.

In accordance with the present invention, it has been found that on the incorporating of mono-hydroxy carboxylic acids in polyvinyl acetal molding compositions, the undesirable properties hereinbefore described have been eliminated.

While the quantities of the acids of this invention employed may be varied widely, it is generally preferred to employ relatively small amounts thereof. Furthermore, while I am not limited by any theories as to the mechanism of the invention, it is believed chemical combination takes place between at least a portion of the acid and partial polyvinyl acetal during the mixing or molding steps.

As suitable mono-hydroxy carboxylic acids I may employ among others, malic, citric, salicylic and lactic acids. It is known to employ stearic acid in polyvinyl acetal molding compositions, but such use is generally unsatisfactory due to discoloration of the molded product and other undesirable features.

The following are given by way of specific examples and are not to be understood as limitative of the scope of the invention.

To portions comprising 100 parts by weight of "Butvar" were separately added 1, 2 and 8 parts by weight respectively of malic acid and the resulting masses thoroughly mixed in a suitable manner and molded in suitable compression and injection molding apparatus. The compositions all exhibited good compression and injection molding properties and were readily removed from the mold. Moreover, the molded products had a good surface finish and the injection molded article did not exhibit laminations.

To portions comprising 100 parts by weight of "Butvar" were separately added 1, 2, 4, 8 and 12 parts by weight respectively of citric acid, and the resulting masses mixed thoroughly on the mill rolls in the well known manner and molded in suitable compression and injection molding apparatus. The compositions all exhibited good compression and injection molding properties and were readily removed from the mold.

To portions comprising 100 parts by weight of "Butvar" there were separately added 1, 2, 4, 6 and 30 parts respectively by weight of lactic acid, and the resulting masses mixed thoroughly on the mixing rolls in the well-known manner, and molded in suitable compression and injection molding apparatus. The compositions all exhibited the properties typical of the class in that they exhibited good molding properties and the molded article was readily removed from the mold.

The polyvinyl acetals may be employed in conjunction with the acids of this invention together with suitable fillers and plasticizers and the resulting mixtures are found to exhibit the desirable molding properties typical of the present invention. Thus, to 100 parts by weight of "Butvar" there were added 6 parts by weight of lactic acid and 25 parts by weight of dibutyl phthalate. The resulting mixture was found to possess good compression and injection molding properties, and the molding product was readily removed from the mold.

As further specific examples of the present invention, to separate portions of 100 parts by weight of "Formvar" having 5% hydroxyl groups calculated as polyvinyl alcohol, 10% to 12% acetate and the balance acetal, there was added 2 parts by weight of lactic acid and varying proportions by weight of dibutyl phthalate added thereto. Thus, separate mixes were formed containing additionally 5, 10 and 15 parts by weight respectively of dibutyl phthalate. The mixes so formed were found to exhibit excellent molding properties and the molded product was free from any tendency to stick to the mold.

As further specific embodiments of the present invention, to separate portions of 100 parts by weight of "Formvar" having 8% hydroxyl groups, calculated as polyvinyl alcohol, 16% acetate and the balance acetal, there was added 2 parts by weight of lactic acid and varying proportions by weight of dibutyl phthalate added thereto. Thus, separate mixes were formed containing additionally 5, 10, 15 and 20 parts by weight respectively of dibutyl phthalate. The compositions so formed were found to exhibit excellent molding properties and furthermore did not exhibit the tendency to stick to the mold as is the case with these same compositions to which lactic acid or another acid of the present invention was not added.

In all cases in the examples given above the molded products had a good finished surface and the injection molded articles did not exhibit the undesirable formation of layers or laminations.

As another modification of this invention, to 100 parts by weight of "Butvar," as defined above, there was added 20 parts by weight of a dibasic acid anhydride, for example, phthalic anhydride, 10 parts by weight of dibutyl phthalate and 5 parts by weight of lactic acid, and the resulting mass mixed in a suitable manner and molded. The product exhibited good molding properties, was readily removed from the mold, and was an improvement in this respect over the same composition in the absence of an acid of this invention. This molded product was somewhat harder than similar molded compositions made in the absence of the anhydride, due it is believed to a reaction taking place between the acetal and the anhydride.

By operating according to the present invention molded products having increased water resistance, toughness, low shrinkage and resistance to heat are readily obtainable. Furthermore, as hereinbefore set forth the polyvinyl acetal molding compositions containing the acids of this invention may contain additionally fillers and if desired suitable plasticizers.

The present invention is limited solely by the claims appended hereto as a part of this application.

What is claimed is:

1. A polyvinyl acetal resin compression or injection molding composition, having a decreased tendency to stick to a mold after molding, containing a polyvinyl acetal resin having from about 5 to about 20% hydroxyl groups calculated as polyvinyl alcohol, up to about 16% acetate groups by weight, and the balance acetal, and normally having a tendency to stick to a mold, to which has been added a sufficient proportion of a mono-hydroxy-carboxylic acid having at least three carbon atoms effective to reduce the tendency to stick to a mold.

2. A molding composition as defined in claim 1 in which said mono-hydroxy-carboxylic acid has less than eight carbon atoms.

3. A molding composition as defined in claim 1 in which said acid is an aliphatic mono-hydroxy-carboxylic acid.

4. A molding composition as defined in claim 1 in which said acid is an aliphatic mono-hydroxy-carboxylic acid having less than seven carbon atoms.

5. A molding composition as defined in claim 1 in which said polyvinyl acetal resin is made with an aliphatic aldehyde having less than six carbon atoms.

6. A polyvinyl acetal resin compression or injection molding composition, having a decreased tendency to stick to a mold after molding, containing a polyvinyl acetal resin made with an aliphatic aldehyde having less than six carbon atoms, said resin having from about 5 to about 20% hydroxyl groups calculated as polyvinyl alcohol, up to about 16% acetate groups by weight, and the balance acetal, and normally having a tendency to stick to a mold, to which molding composition has been added a sufficient proportion of an aliphatic mono-hydroxy-carboxylic acid having at least three and less than seven carbon atoms effective to reduce the tendency to stick to a mold.

7. A molding composition as defined in claim 6 in which said aliphatic aldehyde is formaldehyde.

8. A molding composition as defined in claim 6 to which has been added a sufficient proportion of phthalic anhydride to increase the hardness of the molded composition.

9. A molding composition as defined in claim 6 in which said acid is lactic acid.

10. A molding composition as defined in claim 6 in which said acid is malic acid.

11. A molding composition as defined in claim 6 in which said acid is citric acid.

GEORGE W. WHITEHEAD.